Feb. 9, 1932.                A. C. BECKER                1,844,237
                                TRACTOR
                         Filed Dec. 20, 1930        3 Sheets-Sheet 1
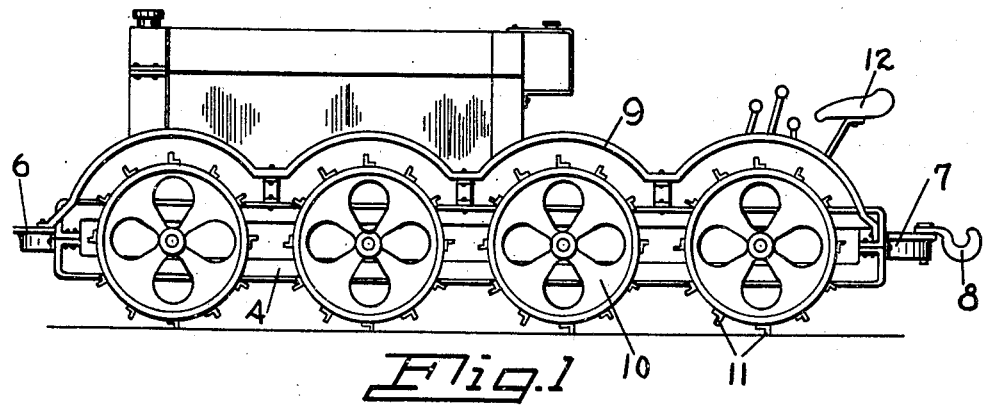
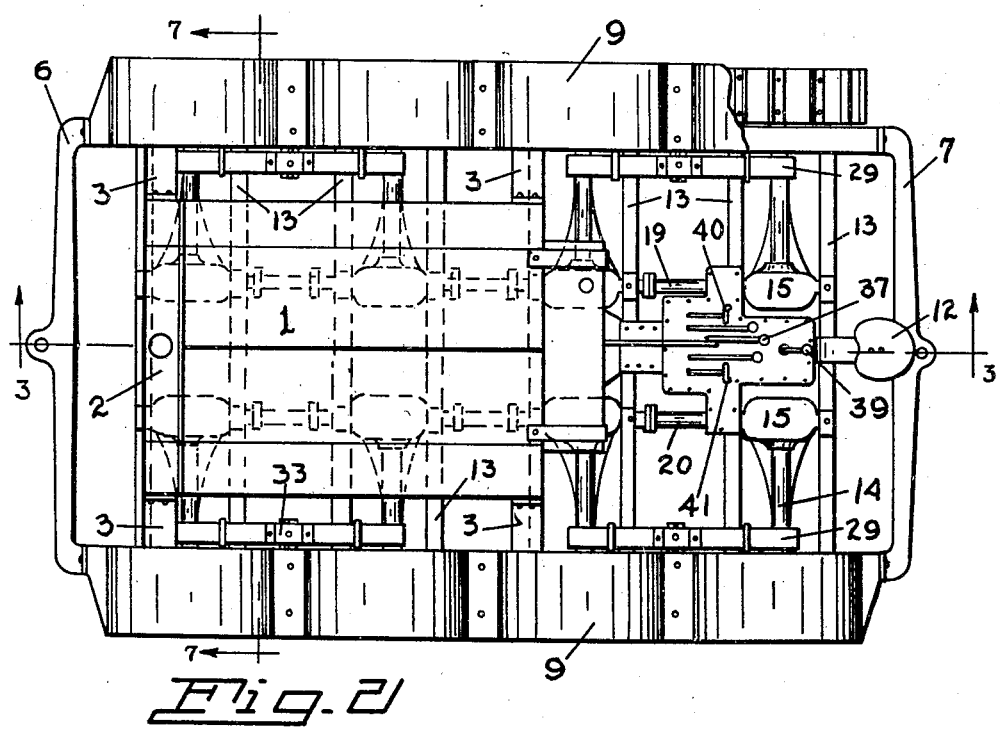
ALVIN C. BECKER
INVENTOR
BY
ATTORNEY Feb. 9, 1932.   A. C. BECKER   1,844,237
TRACTOR
Filed Dec. 26, 1930   3 Sheets-Sheet 2

ALVIN C. BECKER
INVENTOR
BY
ATTORNEY

Feb. 9, 1932.  A. C. BECKER  1,844,237
TRACTOR
Filed Dec. 26, 1930  3 Sheets-Sheet 3

ALVIN C. BECKER
INVENTOR
BY Herbert E. Smith
ATTORNEY

Patented Feb. 9, 1932

1,844,237

UNITED STATES PATENT OFFICE

ALVIN CHARLES BECKER, OF ST. MARIES, IDAHO

TRACTOR

Application filed December 26, 1930. Serial No. 504,695.

My present invention relates to improvements in tractors of the multiple axle motor vehicle type, utilizing two four-wheeled trucks, of which the four tandem wheels at each side of the vehicle or tractor are driven and controlled by duplex clutch mechanism in order that the tractor may be steered by driving and idling the tandem wheels. The eight wheels of the two trucks are each driven, and the shaft and axle of each wheel are pivoted on lines parallel with the longitudinal axis of the vehicle and parallel with its propeller shaft, and means are provided whereby each wheel and the free end of the shaft on which it is journaled may have a vertical movement to compensate for obstructions in the path of travel or of irregularities in the road over which the tractor is traveling. In connection with the vertical movement of the wheels, guide means are provided, and each truck is equipped with a longitudinally extending, semi-elliptic spring for each pair of wheels of each truck, for the purpose of absorbing and compensating for independent movement, vertically, of the wheels, thereby maintaining the main frame or chassis of the vehicle in its normal horizontal position.

The invention consists in certain novel combinations and arrangements of parts for accomplishing the above outlined functions, as will hereinafter be more fully set forth and claimed. In the accompanying drawings I have illustrated one complete example of the physical embodiment of my invention wherein the parts are combined and arranged according to one mode I have thus far devised for the practical application of the principles of my invention.

Figure 1 is a view in side elevation of a tractor embodying my invention.

Figure 2 is a top plan view of the tractor of Figure 1.

Figure 3:
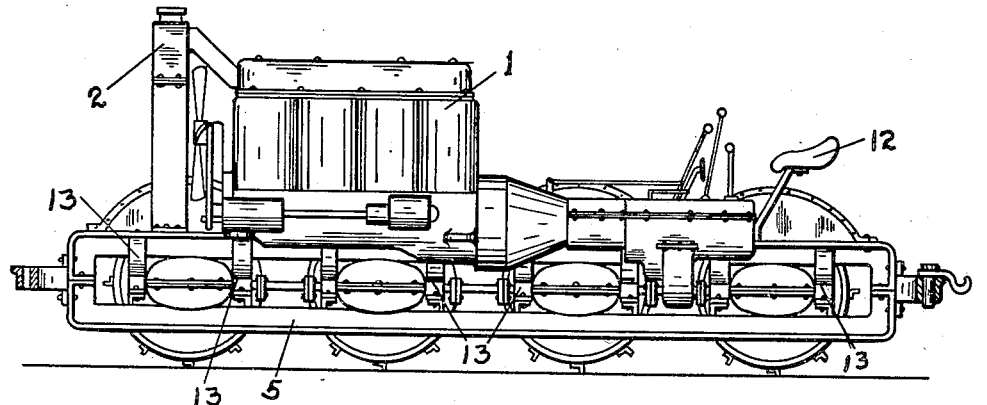
Figure 3 is a view in side elevation, with parts in section as at line 3—3 of Figure 2.
Figure 4:
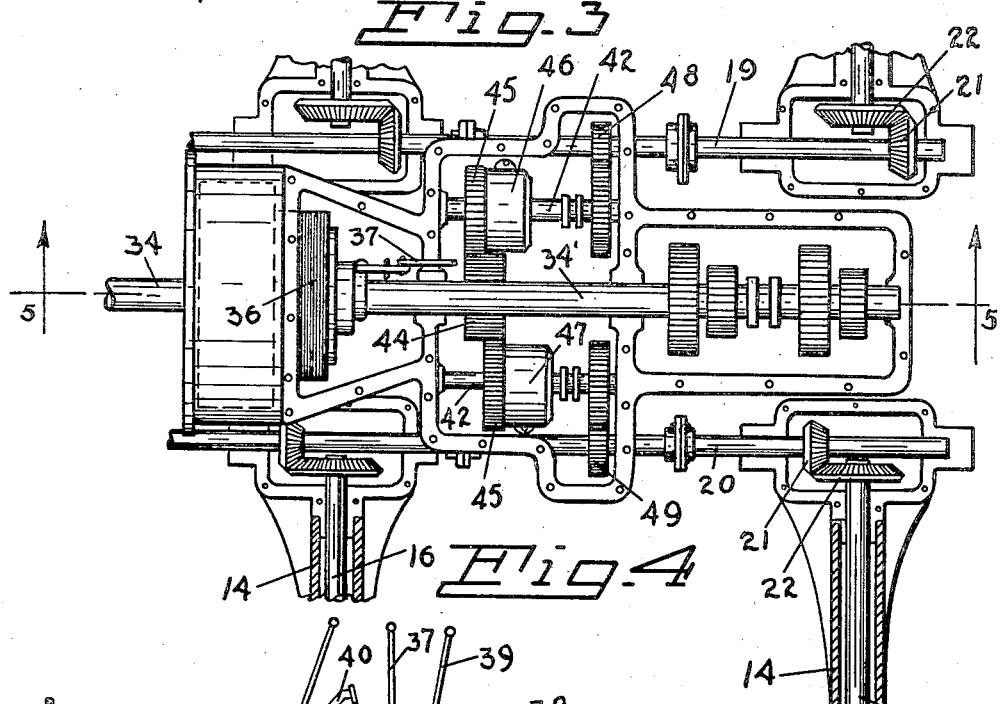
Figure 4 is an enlarged plan view, with parts in section, at the rear end of the tractor, showing the transmission gearing and of the control mechanism.

In the assembly views of the drawings, the motor is indicated as 1 with a usual type of radiator 2 supported on the cross braces 3 that are bolted or riveted to the main frame or chassis of the vehicle. The main frame or chassis includes a pair of open, rectangular side beams 4 and 5, made up of T-bars with complementary bent ends riveted together, and these side beams are spaced apart at opposite sides of and parallel with the longitudinal center of the vehicle. At the front of the tractor the side beams are joined by a draft bar 6, and at the rear of the tractor the side beams are joined by a draft bar 7 provided with a coupling or draft hook 8, and the side means and front and rear bars form a rigid, rectangular main frame for the vehicle.

At the sides of the tractor are provided wheel guards or fenders 9 for the two sets of tandem wheels 10, arranged four at each side of the tractor and provided with the usual traction cleats or shoes 11.

The driver's seat 12 is located at the rear of the vehicle where the driver has ready access for the control mechanism of the tractor.

The side beams of the main frame are rigidly joined by eight, drop, or depressed, transversely extending, struts, as 13, riveted at their ends to the opposite beams, spaced apart, and arranged in parallelism, and these struts provide the supports for the inner ends of eight tubular, transversely extending axles 14 each having a gear case 15 at its inner end. The axles support the wheel shafts 16 and the wheels are mounted, or fixed on the journal ends 17 of the shafts, the usual circular flanges 18 being provided on the shafts for the hubs of the wheels 10.

Figure 6:
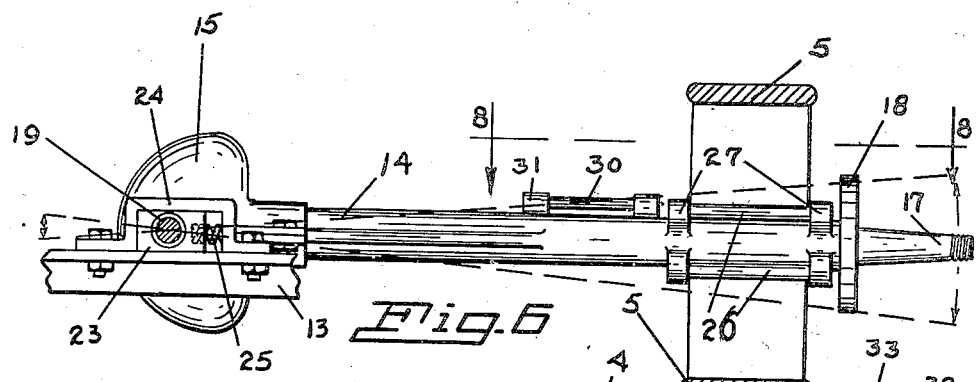
Figure 6 is an enlarged sectional view, transversely of the tractor, showing one of the pivoted axles, wheel shaft and tractor wheel journaled thereon, with means for guiding the vertical movement of the journal end of the shaft.
Figures 8, 9:
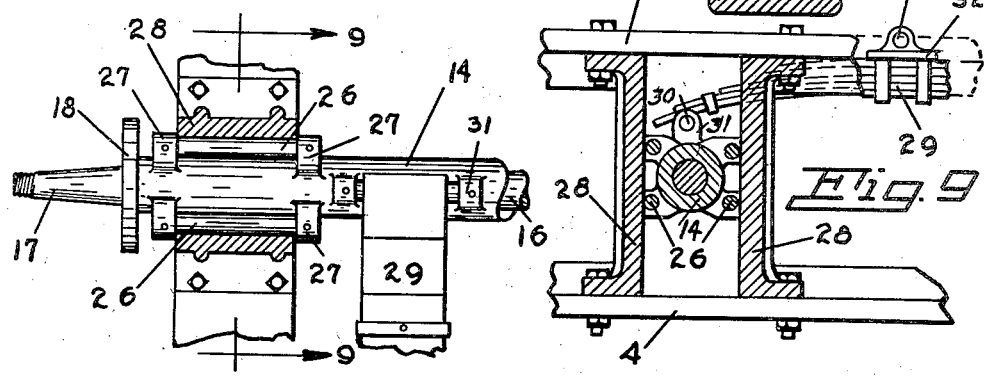
Figure 8 is a horizontal, detail plan view, partly in section, as at line 8—8 of Figure 6, but showing the journal at the opposite side of the tractor.
Figure 9 is a sectional detail view at line 9—9 of Figure 8.

The shafts of each tandem set of four wheels at the sides of the tractor are driven by the two driven shafts 19 and 20 located at opposite sides of the longitudinal center of the vehicle, and power is transmitted from the driven shafts 19 and 20 through pinion 21 and gear 22 forming the gear couple between the shafts. The pinion and gear are enclosed within the housings or cases 15 of the tubular axles, and the shafts 19 and 20 form the pivots for the axles and shafts to permit oscillating movement in a vertical plane of the wheels and the free ends of the wheel shafts, as indicated by the dotted lines showing the range of movement in Figure 6.

The shafts 19 and 20 are journaled in laterally slidable bearing blocks 23, one at each side of the gear case 15, i. e. one at the front and one at the rear side of the case, and these blocks are retained and guided in inverted U-shaped straps or frames 24 bolted on the upper face of the transverse struts 13. By means of springs 25 interposed between the journal block and the outer wall of the block frames, the blocks are urged toward the longitudinal center of the vehicle, and as the wheel shafts and wheels move vertically within the range of the dotted lines in Figure 6, the block is pulled laterally outward against the tension of the spring.

The wheel shafts project through the side beams of the main frame and as the free ends of the shafts with the wheels swing in a vertical plane on the horizontal pivot 19 or 20, the movement of the shaft and axle is guided by two pairs of rollers 26, one pair at the front and one pair at the rear side of the outer end of the axle. These rollers are journaled in spaced ears 27, integral with the axle and projecting toward the front and rear thereof, and the rollers are of course located in planes parallel with the shaft 16. The rollers ride up and down in frictional contact with spaced upright guides 28 interposed between the upper and lower bars of the open side beams 4 and 5, and these guides or plates 28, 28 are rugged and strong, and well braced to withstand the thrust imposed on the axles and shafts of the traction wheels when the vehicle is advancing, or moving to the rear.

Each of the four wheel trucks is provided with a pair of semi-elliptic, longitudinally extending, leaf springs as 29, each one spanning the space between two adjoining axles and located at the inner side of one of the side beams 4 or 5. The opposite ends of each spring rest upon anti-friction rollers 30 journaled in integral ears 31 on the upper part of the tubular axles 14. The central part of each spring is provided with a shackle 32, on top of the spring, and this shackle is pivoted at 33 on a supporting part of the adjoining side beam of the main frame. Thus, as a wheel and its shaft and axle swing on the pivot 19 or 20 to permit the wheel to roll over an elevation on the ground surface, as indicated at the left in Figure 7, the spring-end bearing on the roller 30 of the axle is flexed and rides on the roller as it is straightened, to stabilize the vertical movement of the wheel and absorb such movement before it can reach the main frame of the vehicle. The spring permits the wheel to be depressed without shock or jar as the wheel passes over the irregularity and returns to level ground.

The drive shaft 34 located at the longitudinal center of the motor vehicle is revolved from the motor 1, and at the rear of the tractor is provided with the usual propeller shaft 34' journaled in bearings in the gear case 35, and the engine clutch 36 couples these shafts to revolve together. The main engine clutch is operated by manipulating the control lever 37, and the change speed gearing 38 in the gear case is operated by means of the gear shift lever 39, readily accessible to the driver who sits in the seat 12.

Figure 5:
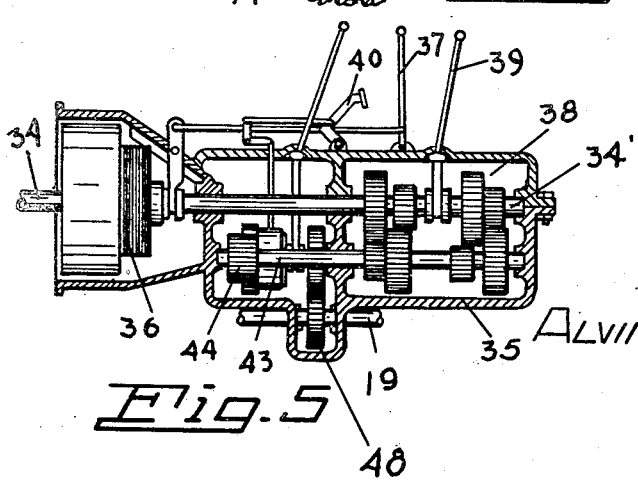
Figure 5 is a vertical, sectional view (on a reduced scale) as at line 5—5 of Figure 4.

In Figures 2 and 5 two foot pedals 40 and 41 are shown for control of the steering-by-driving clutch mechanisms, one at each side of the longitudinal center of the machine and accessible to the driver occupying the seat 12, and these pedals control the clutches through transmission shafts 42, or clutch shafts and the counter shaft 43, the latter located directly below the shaft 34' and the clutch shafts at the sides of this countershaft.

The countershaft is provided with a wide transmission gear 44 with which the gears 45, of the two clutches 46 and 47, mesh and power is thus transmitted through the countershaft and the two clutch shafts, thence through gear couples 48 and 49 to the driven shafts 19 and 20. For steering-by-driving, if a right turn is to be made, the pedal 41 is depressed to release the right hand clutch 46 and disconnect the gear couple 48 to render the right hand wheels 10 idle, while the left hand wheels are driven. To make a left hand turn, the wheels at the left side of the tractor are idle while the right hand wheels are driven.

Various other accessories to complete the tractor are illustrated, but as they are not essential to a clear understanding of my invention, a detailed description is not necessary, and is therefore omitted.

Figure 7:
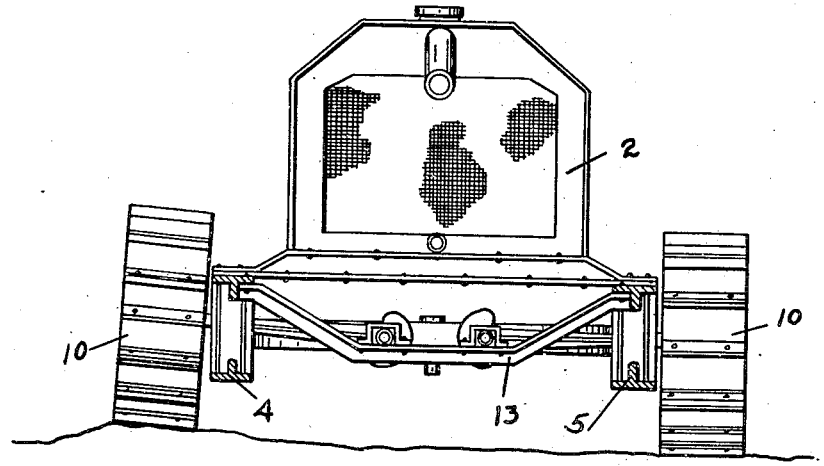
Figure 7 is a view in front elevation with parts in section as at line 7—7 of Figure 2.

It will be apparent that the tractor as illustrated and described is accessible at all parts thereof for repairs or adjustments, the parts are compactly arranged, and the tractor as a whole is rugged and strong to insure durability, and hard usage without danger of broken parts, mis-alinement, or mal-adjustment of the various elements of the vehicle. The suspension of the chassis or main frame by its pairs of springs for the pairs of trucks, and the independent vertical movement of the several traction wheels permits the chassis to maintain its normal horizontal position, as indicated in Figure 7, on rough roads or irregular surfaces, and the traction wheels are constantly maintained in proper position to drive the vehicle regardless of the relative position of the pivoted axles and their shafts.

Having thus fully described my invention, what I claim as new and desire to secure by Letters Patent is:

1. In a tractor, the combination with its main frame including open side beams, of a leaf spring supported on each side beam, two pairs of transversely extending wheel-axles and shafts mounted on the two sides of the frame, struts rigidly connecting the side beams, pivotal supports for said axles on said struts, wheels on the shafts exterior of the side beams, and guide-means within the beams for vertical movement of the axles, shafts and wheels.

2. In a tractor, the combination with its main frame including a pair of open side beams, struts connecting said beams, and a pair of semi-elliptic springs pivoted on said beams, of two pairs of transversely extending tubular axles mounted on the two sides of the frame, shafts within the axles and wheels on the shafts, the free ends of the spring having frictional bearings on the axles, pivotal supports for the inner ends of the axles on said struts, and means within the side members for guiding the vertical movement of the wheels.

3. In a tractor as described, the combination with a main frame including an open side beam and struts rigid therewith, of a driven shaft mounted on said struts, a tubular axle pivoted on the shaft and a wheel-shaft in the axle, gear connections between the two shafts, spaced upright guide plates in the side member for the free end of the axle, and a wheel mounted on the wheel shaft exterior of the side beam.

4. In a tractor as described, the combination with an open side beam and a pair of transverse struts, of a driven shaft, slidable bearing blocks for said shaft mounted on the struts, a tubular axle pivoted on the shaft, spaced upright guides in the side beam for the free end of the axle and anti-friction rollers carried by said axle, a wheel shaft in the axle and gear connections between the two shafts, and a wheel mounted on the shaft exterior of the side beam.

5. The combination with a pair of struts, of a driven shaft, slidable bearing blocks on the struts for said shaft and retaining means for the blocks, a tubular axle having a gear case pivoted on the shaft, a wheel shaft in the axle and gear connections in the case between said shafts, a wheel on the free end of the axle shaft, and means for guiding vertical movement of the free end of the axle.

6. The combination with a pivoted axle, a shaft therein and means for turning the shaft, of an open side beam and spaced upright guide plates in the beam for confining the free end of said axle, anti-friction rollers on the axle for engagement with said plates, a spring supported on the side beam, and an anti-friction roller on the axle for contact with said spring.

In testimony whereof I affix my signature.

ALVIN CHARLES BECKER.